Jan. 8, 1963     J. J. HENRY     3,072,282
SHIP
Filed Feb. 4, 1960     2 Sheets-Sheet 1
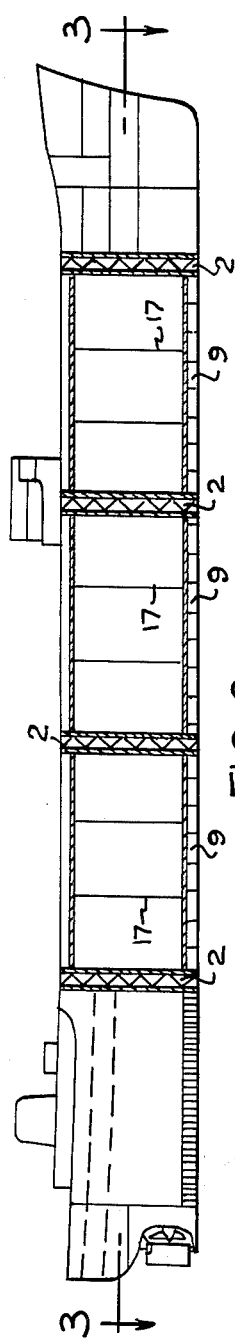
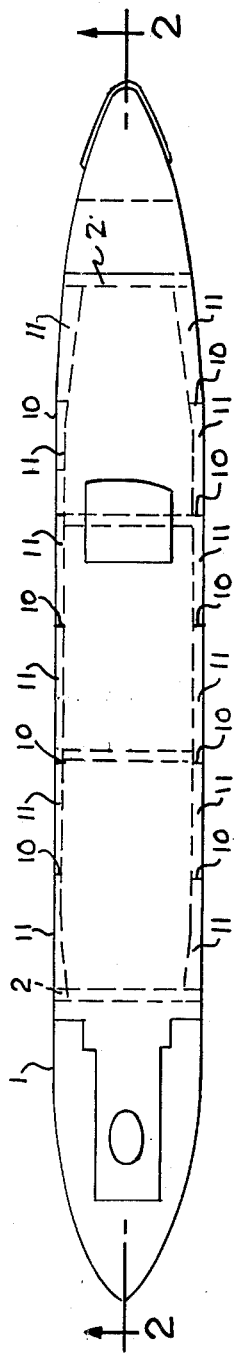
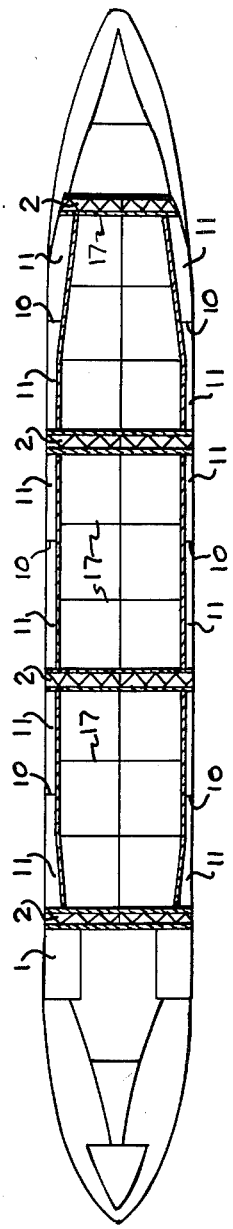
INVENTOR.
JAMES J. HENRY
BY
Ooms, McDougall & Hersh
ATTORNEYS Jan. 8, 1963    J. J. HENRY    3,072,282
SHIP
Filed Feb. 4, 1960    2 Sheets-Sheet 2
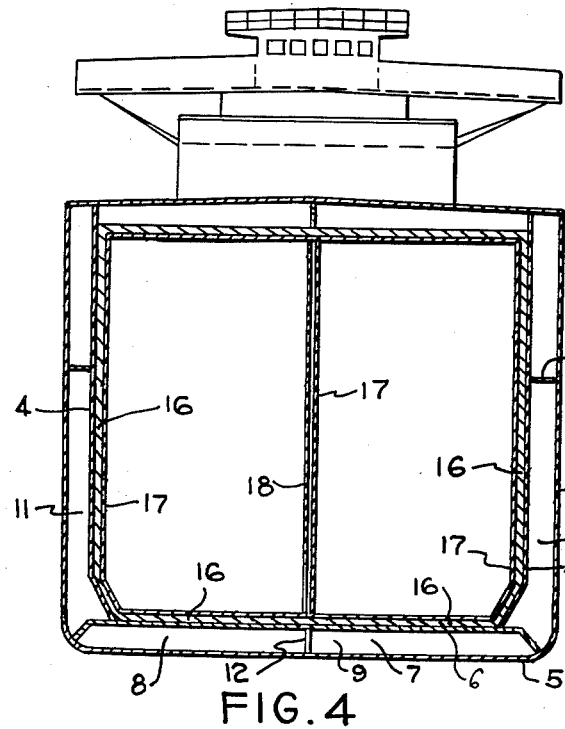
INVENTOR.
JAMES J. HENRY
BY
Ooms, McDougall & Hersh
ATTORNEYS

United States Patent Office 3,072,282
Patented Jan. 8, 1963

3,072,282
SHIP
James J. Henry, New York, N.Y., assignor to Conch International Methane Limited, a Bahama corporation
Filed Feb. 4, 1960, Ser. No. 6,701
2 Claims. (Cl. 220—15)

This invention relates as indicated to ships and, more especially, to ships designed especially for the transportation of liquid cargo which needs to be maintained at a temperature substantially below zero and at substantially atmospheric pressure.

This is a continuation-in-part of application Serial No. 582,965, filed May 7, 1956 and entitled "Ship" and now Patent No. 3,021,808.

While a ship constructed in accordance with the principles of this invention may be used for the purpose of transporting a wide variety of different types of liquid cargo which need to be maintained at an extremely cold temperature in order to be liquid at atmospheric pressure, the present invention will be described with more particularity with respect to the transportation of liquefied natural gas or substantially pure methane which is a liquid at substantially atmospheric pressure at temperatures below minus 258° F.

Since it will be remembered that the storage on land of liquefied natural gas at substantially atmospheric pressure has resulted in at least one major catastrophe due to failure of the structure supporting the storage container, some of the problems incident to the design of a ship for safely transporting this same material will be appreciated.

In hauling liquefied natural gas or methane at substantially atmospheric pressure, hereinafter for convenience referred to as "the cargo," some of the unusual factors which arise may be enumerated as follows: the cargo should be maintained at substantially atmospheric pressure since the use of vessels with walls strong enough to maintain the cargo under super-atmospheric pressure of any substantial degree would so materially add to the dead weight of the ship as to make such a construction economically unattractive. Means must be provided for preventing too great a transfer of heat from the surrounding sea and atmosphere from penetrating to the cargo and vaporizing it. The hull of the ship must be thermally insulated from the cargo so that the latter will not refrigerate the members of the hull, when made of steel, which are required to carry structural stresses; otherwise the ship will be unsafe. The tanks or the like within which the cargo is contained should be capable of being hydrostatically tested before assembled in the ship in order to insure that they are structurally sound. The specific gravity of the cargo is relatively light so that the relative proportions of the ship should be such that the maximum volume of cargo can be accommodated while at the same time not detracting from the seaworthiness of the ship. While the tanks or containers for the cargo must be thoroughly thermally insulated so as to prevent undue evaporation of the cargo in transit, nevertheless means must be provided whereby access to such tanks can be had for rapid loading and unloading thereof. Since the individual tanks for the cargo will during loading and unloading and at other times be subjected to severe temperature gradients over different areas or throughout different portions thereof, their placement in the vessel must be such that while they are adequately supported against damage during the voyage, nevertheless they dare not subject the structure of the hull to substantial stresses due to the occurrence of temperature gradients.

It is among the principal objects of this invention to provide a ship structure which will satisfy all of the foregoing requirements. Other objects of the invention will appear as the description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of a few of the various ways in which the principle of the invention may be employed.

In said annexed drawings:

FIG. 1 is a diagrammatic plan view of a ship showing one embodiment of this invention;

FIG. 2 is a vertical section of the ship shown in FIG. 1 taken on the vertical plane substantially indicated by the line 2—2;

FIG. 3 is a horizontal section of the ship illustrated in the previous figures taken on the plane substantially indicated by the line 3—3 in FIG. 2;

FIG. 4 is a diagrammatic transverse sectional view of the ship illustrated in the previous figures taken on a transverse plane at about midship;

FIG. 5 is a fragmentary sectional view of a portion of the side structure illustrated in FIG. 4, drawn to an enlarged scale;

FIG. 6 is a diagrammatic representation similar to that of FIG. 4 showing a modified form of construction of this portion of the ship; and FIG. 7 is a perspective view partially in section showing the stabilizing means.

Referring now more specifically to the drawings and more especially to FIGS. 1 to 3, the ship here illustrated as an embodiment of this invention has one pronounced characteristic which is quite different from other ships of this type which have been previously built. The ship of the present construction has a depth-to-beam ratio of about 1:1.1. This unusual depth-to-beam ratio, which provides a substantially square cross-section of the ship amidships, as illustrated in FIG. 4 and which is novel particularly with regard to its unusual depth, is desirable and practical for the following reasons. In the first place, the increased depth as compared with the beam is desirable from the standpoint of providing maximum cargo space for the liquefied low specific gravity material without any substantial sacrifice on the speed and navigability of the ship. The ship of the present design will, as previously indicated, need to have some means of thermally insulating the extremely cold cargo from the stress-carrying hull of the ship. While this thermal insulation is accomplished in part by fixed thermal insulation layers surrounding the cargo holds wherein the cargo tanks are contained, nevertheless as a further safe-guard the ship is provided with wing tanks which completely surround the sides of such cargo spaces and extend upwardly to the deck. These wing tanks will at all times contain some ballast. When the cargo tanks are full, it is necessary that the wing tanks be at least partially filled with ballast such as sea water or fresh water, and most desirably, such ballast will be either constantly replenished or recirculated so as to insure that there will be no temperature gradients set up in the load-supporting shell of the ship. The fact that these ballast tanks will be at least partially filled at all times, even when the ship is fully loaded, makes practical the unique depth-to-beam ratio which characterizes this design.

The hull of the ship is generally indicated at 1 and extending thereacross at spaced intervals in accordance with conventional ship design are a plurality of cofferdams generally indicated at 2. Before proceeding further with the detailed description of this invention, it may be well to note that in the drawings the customary structural bracing members usually employed in ship construction have been omitted in order not to unduly obscure the essential features of construction sought to be illustrated by the drawings. It is believed unnecessary to show such structural bracing members since in this particular the present structure employs conventional practice.

It should be pointed out, however, as most clearly illustrated in FIG. 4, that aside from the transversely extending cofferdams 2, the cargo space within the hold of the ship is otherwise unobstructed. Thus, the shell of the hold consisting of the outer skin 3 and an inner skin 4 suitably cross-braced provide the necessary structural strength for the hull between the cofferdams. Similarly, a conventional bottom generally indicated at 5 has a secondary bottom generally indicated at 6 associated therewith to provide a space 7 along the bottom of the ship which is subdivided into a plurality of bottom tanks 8 and 9. The double-walled sides of the ship are subdivided by means of fluid-tight spacers, generally indicated at 10, whereby the double-walled sides of the ship are subdivided into a plurality of wing tanks generally indicated at 11.

The bottom space 7 below the cargo spaces is subdivided longitudinally of the hull by partition 12. That partition 12, cooperating with the cofferdams 2, subdivides the bottom of the ship, that is, the space 7 into a plurality of independent bottom tanks, as most clearly referred to hereinafter in connection with the description of FIGS. 4 to 7 inclusive.

The wing tanks may have a horizontal partition 13, as most clearly illustrated in FIGS. 4 and 5, therein extending between the outer skin 3 and the inner shell 4 of the hull. The plate 13 may be perforate or imperforate, depending on the particular type of system used for the purpose of preventing the refrigeration of the hull structure by the temperature transferring liquid medium used in the wing tanks generally.

In FIG. 5 the member 14 is a structure-reinforcing member of conventional design associated with the outer skin 3 of the hull. The structural member 15 is of conventional design associated with the inner shell 4. Actually, additional cross-bracing members would be present in the final construction but, as previously indicated, these have been omitted in order that they not obscure the essential elements of the structure which characterizes the ship of this invention. The layer 16 is a layer of insulating material and the element 17 is a portion of the cargo tank to which more specific reference will be had hereinafter.

In the embodiment of the invention illustrated in FIGS. 1 to 3 and 4, for example, the cargo storage tanks are generally indicated at 17. In the embodiment of the invention shown in FIG. 3, there are six of such individual tanks in each of the hold spaces between adjacent cofferdams. These individual tanks 17 are preferably formed of aluminum, or more particularly an aluminum alloy of about the following composition:

| | Percent |
|---|---|
| Magnesium | 3.1 to 3.9 |
| Chromium | 0.15 to 0.35 |
| Copper, max | 0.10 |
| Zinc, max | 0.20 |
| Iron plus silicon, max | 0.45 |
| Manganese, max | 0.10 |
| Other, each, max | 0.05 |
| Other, total, max | 0.15 |
| Aluminum | remainder |

The American Society of Mechanical Engineers has the following designation for this alloy: Alloy GR40A Specification SB–178.

This material has the very desirable property of not having its physical properties substantially impaired when the temperature thereof is reduced to about minus 258° F. A decided advantage accrues from the proportioning of the sizes of the tank 17 so that six may be placed in each cargo space between the cofferdams. The use of six individual tanks in each such space has many advantages. Most efficient use is made of the insulation in the cargo when this number of tanks is used and when such number is used in a ship having a depth-to-beam ratio of 1 to about 1.1 each of such tanks will have the most desirable configuration from the standpoint of height and cross-section. The specific design construction of these individual cargo tanks forms no part of the present invention. It is believed sufficient to state that they are prefabricated and provided with internal cross-bracing so that they are self-supporting and may be hydrostatically tested with the equivalent of a full cargo before they are assembled in the ship. Such preliminary testing is necessary in order to insure that there will be no leaks in the cargo tanks after they have been assembled in the ship. The fact that the tanks 17 are about twice as high as they are wide is an important feature in that when this proportion is maintained, then the problem of most economically constructing a self-supporting tank which may be pretested hydrostatically is greatly simplified.

When the ship is initially built, the double-walled sides in cooperation with the cofferdams makes it possible to extend the inner shell 4 to the deck level and to thus provide an unobstructed cargo space between the cofferdams into which the tanks 17 may be lowered after they have been preliminarily tested. The inner surfaces of the side and bottom plates 4 and 6 have applied thereto a substantial layer of a thermal insulation material 16. It is essential that such insulation material be rigid, i.e., non-settling, so that the tanks may be assembled in the hold space with a slight clearance between the outer walls of the tank 17 and the insulation 16 in the manner illustrated in FIG. 11. This feature is desirable for the reason that in this way flexure of the hull of the ship in heavy seas will not result in a substantial flexure of the tanks 17. No thermal insulation is required in the slight space 18 which is desirably left between the individual tanks themselves. It may be found helpful, however, to include in such space 18 a material which is substantially unaffected at the low temperature encountered in these areas, which material has the property, however, of preventing scuffing between the adjacent surfaces of adjacent tanks. The inclusion of a layer or film of "Teflon" (polytetrafluoroethylene) in space 18 will be found desirable for this last-named purpose.

The insulating layer 16 may be formed entirely of a single thermal insulating material or from a lamination of a plurality of such materials. A material admirably suited for such insulating layer is balsa wood. Since balsa wood is available only in pieces of limited cross-sectional area, the layer 16 if made of such wood will be built up of a plurality of pieces cemented together. Balsa wood is admirably suited for this purpose because it possesses not only excellent thermal insulating properties but also is able to provide substantial structural support for the tanks 17. In order to prevent chafing of the relatively fragile inner face of the insulating layer 16, there may be applied to such face adjacent the tank 17 a layer or lamination of a stronger material such as a hard wood or a layer of other abrasion-resistant material.

The use of balsa wood as the insulating layer 16 is desirable for many reasons. One of such is that balsa wood, even though laminated, is sufficiently porous that if a tank 17 should develop a leak in a local area, the liquefied methane will progress outwardly through the capillaries of the balsa wood and appear as a cold spot on the inside of the shell 4. The occurrence of such a cold spot can be readily detected and when balsa wood is used, it will be in close proximity to the area where the tank 17 has developed the leak and accordingly the location of any such leak can be quickly and accurately determined.

It may be desirable to provide some means for anchoring the tanks 17 against lateral shifting on the bottom of the ship. This may be accomplished by providing a single or transversely intersecting ribs or keys 19 on the bottom of the tank 17 which are received in complementary recesses or keyways in the bottom layer of insulation and, if desired, the bottom shell 6 may have a groove 20 formed therein coinciding with such recess in the insulation so as to make possible a uniform layer of insulation even in the area where such ribs from the bottom of the tank extend into the insulating layer. The key and keyways are arranged to radiate from a center aligned with the central portion extending vertically through the tank and the keyways are dimensioned to have a length greater than the keys received therein and in which the keys are received in sliding relationship within the keyways for relative endwise movement therebetween in response to expansions and contractions of the tanks when in the installed relation. It is, of course, apparent that the key 19 and groove 20 system provides means for stabilizing the position of the tanks within the storage space while permitting freedom of the tanks for relative movement in expansion and contraction due to temperature change which results from the presence and the level of liquid therein.

I claim:

1. In the storage and transportation of a liquefied natural gas, a fluid tight outer shell formed of a rigid, structurally strong and fluid impervious material defining a storage space therein, a thick layer of thermal insulating material lining the surface of the outer shell to provide an insulated space, the insulation lining, in at least the bottom wall, being structurally strong and dimensionally stable to carry the load of the cargo tanks when filled with the liquefied gas, a cargo tank for the liquefied gas formed of an inner shell of a fluid and vapor impervious material having structural strength for self-sufficiency under load when the tank is filled with liquefied gas, said inner shell resting on the bottom wall of the insulation lining but without rigid attachment to the insulation lining and outer shell to leave the inner shell free for expansion and contraction movements independently of the insulation lining and the outer shell, and means for stabilizing the position of the inner shell within the insulated space without interfering with its freedom of expansion and contraction movements comprising grooves in the upper surface of the insulating material adjacent the bottom face of the inner shell to form keyways the lengths of which are considerably greater by comparison with the width and which are radially aligned with a centralized stabilized position of the tank, and keys fixed to the underside of the inner shell in positions to correspond with the grooves the latter of which are dimensioned to have a length greater than the length of the keys for receiving the keys in unbonded relation therein when the inner shell is in position of use and in which the contacting faces of the inner shell and the upper surface of the insulation lining are otherwise unobstructed throughout with respect to any sliding relationship therebetween thereby to stabilize the position of the inner shell relative to the outer shell while permitting the inner shell to change in all dimension relative to the outer shell responsive to expansion and contraction.

2. In the storage and transportation of a cold liquid, a fluid tight outer shell formed of a rigid, structurally strong and fluid impervious material defining a storage space therein, a thick layer of a thermal insulating material lining the surface of the outer shell to provide an insulated space, the insulation lining, in at least the bottom wall, being structurally strong and dimensionally stable to carry the load of the cargo tanks when filled with the liquid, a cargo tank for the liquid formed of an inner shell of a fluid and vapor impervious material having structural strength for self-sufficiency under load when the tank is filled with liquid, said inner shell resting on the bottom wall of the insulation lining but without rigid attachment to the insulation lining and outer shell to leave the inner shell free for expansion and contraction movements independently of the insulation lining and the outer shell, and means for stabilizing the position of the inner shell within the insulated space without interfering with its freedom of expansion and contraction movements comprising grooves in the upper surface of the insulating material adjacent the bottom face of the inner shell to form keyways the lengths of which are considerably greater by comparison with the width and which are radially aligned with a centralized stabilized position of the tank, and keys fixed to the underside of the inner shell in positions to correspond with the grooves the latter of which are dimensioned to have a length greater than the length of the keys for receiving the keys in unbonded relation therein when the inner shell is in position of use and in which the contacting faces of the inner shell and the upper surface of the insulation lining are otherwise unobstructed throughout with respect to any sliding relationship therebetween thereby to stabilize the position of the inner shell relative to the outer shell while permitting the inner shell to change in all dimensions relative to the outer shell responsive to expansion and contraction.

References Cited in the file of this patent

UNITED STATES PATENTS

| 2,172,154 | Perin | Sept. 5, 1939 |
| 2,810,265 | Beckwith | Oct. 22, 1957 |
| 2,954,003 | Farrell et al. | Sept. 27, 1960 |

FOREIGN PATENTS

| 437,295 | Great Britain | Oct. 28, 1935 |
| 667,215 | Great Britain | Feb. 27, 1952 |